(12) United States Patent
Memmen et al.

(10) Patent No.: US 10,794,190 B1
(45) Date of Patent: Oct. 6, 2020

(54) CAST INTEGRALLY BLADED ROTOR WITH BORE ENTRY COOLING

(71) Applicant: Florida Turbine Technologies, Inc., Jupiter, FL (US)

(72) Inventors: Robert L Memmen, Stuart, FL (US); William L Plank, Tequesta, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 146 days.

(21) Appl. No.: 16/048,775

(22) Filed: Jul. 30, 2018

(51) Int. Cl.
   *F01D 5/08* (2006.01)
   *F01D 5/18* (2006.01)
   (Continued)

(52) U.S. Cl.
   CPC .............. *F01D 5/087* (2013.01); *B22C 9/10* (2013.01); *F01D 5/186* (2013.01); *F01D 5/34* (2013.01); *F05D 2220/323* (2013.01); *F05D 2230/21* (2013.01); *F05D 2240/24* (2013.01); *F05D 2250/14* (2013.01); *F05D 2250/232* (2013.01); *F05D 2250/33* (2013.01); *F05D 2250/51* (2013.01); *F05D 2250/71* (2013.01); *F05D 2250/72* (2013.01); *F05D 2260/202* (2013.01)

(58) Field of Classification Search
   CPC ... F01D 5/34; F01D 5/18; F01D 5/183; F01D 5/184; F01D 5/186; F01D 5/187; F01D 5/08–088; B22C 9/10
   USPC ....................................................... 29/889.23
   See application file for complete search history.

(56) References Cited

U.S. PATENT DOCUMENTS 2,405,190 A * 8/1946 Darling ..................... F01D 3/02
                                                            415/100
2,649,278 A * 8/1953 Stalker ..................... F01D 5/021
                                                            415/115
(Continued)

FOREIGN PATENT DOCUMENTS

DE         855023 C    * 11/1952
FR      2152437 A1  *  4/1973
(Continued)

OTHER PUBLICATIONS

Aw-nauticalgifts. '9" Weathered Ceramic Ship Wheel' available since at least Sep. 19, 2016. https://www.ebay.com/itm/9-Weathered-Ceramic-Ship-Wheel-Weathered-Ship-Wheel/121524082331?hash=item1c4b66569b:g:5YYAAOSwnDxUlvJw (Year: 2016).*

(Continued)

*Primary Examiner* — Moshe Wilensky
*Assistant Examiner* — Topaz L. Elliott
(74) *Attorney, Agent, or Firm* — Christopher & Weisberg, P.A.

(57) ABSTRACT

An air cooled integrally bladed rotor with bore entry cooling holes for a small gas turbine engine cast using a ceramic core having an axial bore forming piece with a plurality of radial extending spokes that end in an annular ring to form cooling air supply passages for air cooled turbine blades. Bulbous chambers are formed in a circumferential cooling air supply channel formed below each blade, where cooling air holes are drilled from a tip of each blade and into the bulbous chambers. The radial spokes have an elliptical cross sectional shape with a major axis perpendicular to a rotational axis of the central bore of the IBR. A spacing of the inlet openings in the bore are minimized to reduce stress.

8 Claims, 4 Drawing Sheets

(51) Int. Cl.
 *F01D 5/34* (2006.01)
 *B22C 9/10* (2006.01)

(56) References Cited

U.S. PATENT DOCUMENTS

| | | | | |
|---|---|---|---|---|
| 2,657,902 | A | * | 11/1953 | Williams .............. F01D 5/021 29/889.2 |
| 3,742,706 | A | | 7/1973 | Klompas |
| 3,749,514 | A | * | 7/1973 | Kelch .................. F01D 5/087 416/95 |
| 3,778,188 | A | * | 12/1973 | Aspinwall .............. F01D 5/183 416/97 R |
| 3,982,852 | A | * | 9/1976 | Andersen .............. F01D 5/087 416/95 |
| 4,102,603 | A | | 7/1978 | Smith et al. |
| 4,312,625 | A | | 1/1982 | Pinaire |
| 4,415,310 | A | * | 11/1983 | Bouiller ................ F02C 7/18 415/115 |
| 4,447,188 | A | | 5/1984 | Davis et al. |
| 4,522,562 | A | | 6/1985 | Glowacki et al. |
| 5,226,785 | A | * | 7/1993 | Narayana .............. F01D 5/02 415/115 |
| 5,244,345 | A | | 9/1993 | Curtis |
| 5,317,877 | A | | 6/1994 | Stuart |
| 5,465,780 | A | | 11/1995 | Munter et al. |
| 5,860,789 | A | | 1/1999 | Sekihara et al. |
| 5,961,287 | A | | 10/1999 | Cairo |
| 6,185,924 | B1 | | 2/2001 | Matsumoto .......... F01D 5/082 415/110 |
| 6,354,780 | B1 | * | 3/2002 | Davis .................. F01D 5/027 414/146 |
| 6,514,038 | B2 | | 2/2003 | Akiyama et al. |
| 7,559,745 | B2 | | 7/2009 | Alk et al. |
| 7,585,148 | B2 | | 9/2009 | Hoell |
| 8,556,576 | B2 | * | 10/2013 | Wilson, Jr. ........... F01D 5/081 415/115 |
| 9,726,022 | B2 | | 8/2017 | Mittendorf et al. |
| 10,024,170 | B1 | | 7/2018 | Memmen |
| 2007/0140864 | A1 | * | 6/2007 | Higgins ................ F01D 5/02 416/248 |
| 2008/0295988 | A1 | | 12/2008 | Bancheri et al. |
| 2010/0326039 | A1 | * | 12/2010 | Arase .................. F01D 5/081 60/39.01 |
| 2013/0017059 | A1 | * | 1/2013 | Wu ....................... F01D 5/08 415/1 |
| 2014/0348664 | A1 | | 11/2014 | Jan et al. |
| 2016/0348517 | A1 | * | 12/2016 | Kenyon ................ F01D 5/34 |
| 2018/0230833 | A1 | * | 8/2018 | Kush .................... F01D 5/34 |

FOREIGN PATENT DOCUMENTS

| | | | |
|---|---|---|---|
| FR | 2614654 | A1 * | 11/1988 |
| GB | 611044 | A * | 5/1945 |
| GB | 663844 | A * | 12/1951 |
| JP | 10103001 | A * | 4/1998 |

OTHER PUBLICATIONS

Whitley, David Warren, "Interacting stress concentration factors and their effect on fatigue of metallic aerostructures" (2013). Doctoral Dissertations. 1830. Accessed from https://scholarsmine.mst.edu/doctoral_dissertations/1830 (Year: 2013).*

* cited by examiner

CAST INTEGRALLY BLADED ROTOR WITH BORE ENTRY COOLING

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to an integrally bladed rotor for a small gas turbine engine with blade cooling.

Description of the Related Art Including Information Disclosed Under 37 CFR 1.97 and 1.98

In a gas turbine engine, compressed air from a compressor is supplied to a combustor and burned with a fuel to produce a hot gas stream that is then passed through a turbine to produce mechanical energy. In an aero engine, the turbine drives both the compressor and a fan that produces the propulsion to power an aircraft.

The efficiency of the engine can be increased by passing a higher temperature gas stream through the turbine. However, the turbine inlet temperature is limited to the material properties of the turbine as well as the effectiveness of the turbine cooling. Compressed air is bled off from the compressor and passed through cooling circuits formed within stator vanes and rotor blades of the turbine to allow for higher turbine gas stream temperatures.

Turbine rotor blades are typically formed as a single piece with an airfoil extending from a root and platform to form the single piece rotor blade. The root typically has a dovetail or fir tree shape that is inserted into a fir tree or dovetail slot form on an outside surface of a rotor. A small gap is thus formed between the blade root attachment and the rotor disk slot. In a large engine such as the type that powers a commercial or military aircraft, this gap is small compared to the size of the rotor. Thus, any leakage across the gap will be small compared to the flow passing through the rotor.

However, for a small gas turbine engine such as those used to power an Unmanned Aero Vehicle (UAV), the attachment gap is large when compared to the flow through the smaller rotor. For a gas turbine engine with a rotor with a diameter of less than four inches, any gap formed between the blade attachment and the rotor disk slot is the same as in larger engines but will be a larger percentage of the total flow and therefore the leakage flow across the rotor will be significant. For this reason, small gas turbine engines typically use an integrally bladed rotor (IBR) in which the rotor and the blades are all formed as a single piece to eliminate the gaps.

In a small IBR for a small gas turbine engine, the rotor blades are so small that casting cooling air passages is so difficult that it is not done. To cast small cooling holes in a small blade, a ceramic core would be used. The pieces of the ceramic core would be so small that breakage would often occur when pouring liquid metal around these small pieces. Very low casting yields would result.

When cooling of airfoils is incorporated in a turbine engine, the non-cooling usage of the cooling air (leakage) is minimized as this represents a penalty to the engine cycle and reduces engine efficiency. Rather than routing cooling air to the blades past the rim of the disk (high leakage) it is desired to rout the cooling air from the bore of the disk, through the center of the disk, and to the blades.

BRIEF SUMMARY OF THE INVENTION

An air cooled integrally bladed rotor with bore entry cooling holes for a small gas turbine engine which is cast using a ceramic core that includes an axial bore forming piece with a number of radial spokes extending outward from the bore and ending in an annular ring that includes a number of bulbous sections that are positioned in a mold below where airfoils will be formed so that radial holes can be drilled through tips of each blade and into the bulbous chambers formed in the IBR.

Each radial spoke has an elliptical cross section shape with a major axis perpendicular to an axis of the bore and in such numbers that the inlet openings of the hole within the axial bore have such spacing that very little space is left between adjacent inlet holes in order to take advantage of the stress concentration shielding effect of one hole to the next.

The bulbous sections formed bulbous chambers in the IBR in a circumferential cooling air supply channel and just below each airfoil to make drilling the cooling air holes in each blade and into the supply air supply channels more achievable.

DETAILED DESCRIPTION OF THE INVENTION

Figure 1:
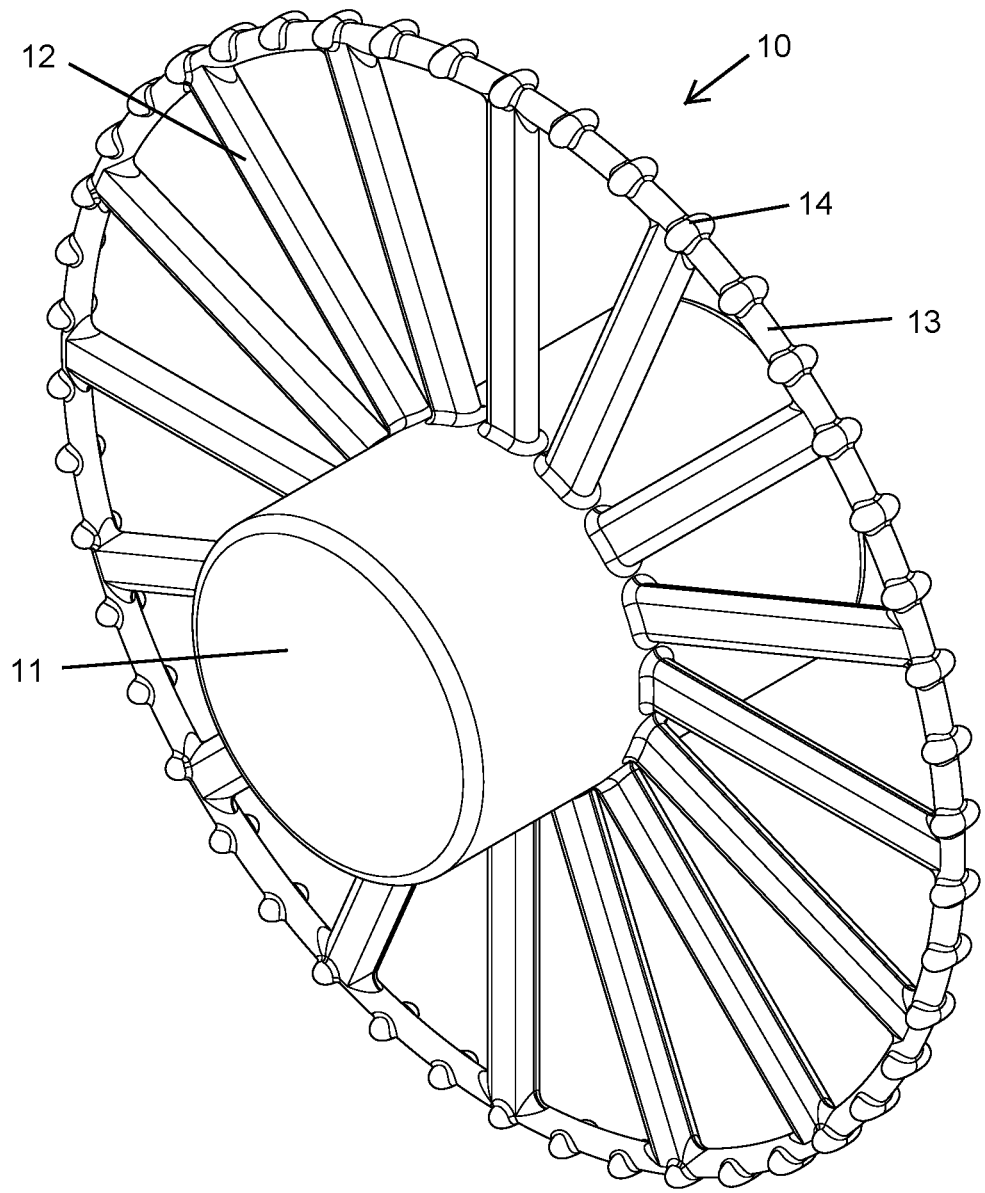
FIG. 1 shows an isometric view of a ceramic core used to cast cooling passages in an IBR of the present invention.

The present invention is an IBR with bore entry cooling holes for a small gas turbine engine formed using a ceramic core that includes elliptical shaped radial spokes that form openings in the IBR through which cooling air is introduced into the rotor blades at a rim. Depending on the amount of cooling air required and the surrounding stress field the shape and number of radial spokes vary. The ceramic core also includes a circumferential channel or ring adjacent to the disk live rim. The circumferential ring connects the radial spokes which form channels in the casting. The use of the circumferential ring allows for changing the number of radial spokes depending on the flow area required, the resultant stress values present at the axial ligament between the ports at the bore of the rotor, and the rigidity and strength of the radial spokes when formed as a ceramic pattern for the investment casting process. Fewer radial spokes with the same flow area result in a more rigid ceramic core which is important to help the ceramic core retain its correct position during pattern preheat and liquid metal pouring into a mold. The circumferential ring also includes bulbous sections or peanuts at location directly under each airfoil. These peanuts are for the purpose of facilitating the subsequent manufacture of airfoil cooling holes.

The shape and number of entrance holes at the bore of the rotor are critical to the subsequent expected life of the rotor system in operation. The reason for this criticality are the high resultant stresses at the bore of the rotor. Because the bore of the rotor acts to restrain everything connected outboard, it has very high tangential stress which is in tension. With proper design practice, this stress is close to the yield stress of the material used to form the IBR. By keeping the radial channels which are formed by the radial spokes closely spaced, each radial channel shields adjacent radial channels from excessive stress concentration in the tangential direction of the IBR bore. The corners of the radial channels are formed with a generous radius ensuring an acceptable stress concentration ($K_T$). At the same time that there is a high tangential stress in the bore, the Poisson's effect creates an axial compressive stress of the magnitude of 35 KSI. This by itself has little effect on the bore in terms of subsequent fatigue life. However, when combined with the radial coolant flow channels, the resultant stress concentration factor could result in a concentrated stress far in excess of allowable stress values. Since there is no shielding of the radial cooling channels in the axial direction of the bore, with one respect to the other, the shape of the resulting ligament between the radial channels is critical in order to minimize the stress concentration. This is why this portion of the flow channel is formed with an elliptical cross sectional shape with a major axis parallel to the axis of the centerline of the bore extending from a front face of the disk to a rear face.

The axial location of the radial coolant channel in the cast IBR is critical to prevent a thin side wall structure and also to facilitate subsequent machining operations. The circumferential channel also provides a tie between the radial coolant channels such that flow can evenly be distributed to each airfoil and to also provide a method for positioning the ceramic core in the casting pattern during the investment casting process and subsequent pour.

Again, the number, the shape, and the placement of the radial spokes in the ceramic core is critical to optimize a stress field in order to yield a cast IBR with acceptable low cycle fatigue life.

The ceramic core used to form the IBR with bore entry cooling holes is shown in FIG. 1. The ceramic core 10 includes an axial bore forming piece 11, a number of radial spokes 12 extending outward from the bore forming piece 11, a circumferential ring 13 attached to outer ends of the radial spokes 12, and a number of bulbous sections or peanuts 14 on the circumferential ring 13. The peanuts have a peanut shape and are at locations on the ring 13 where the airfoils will extend outward from. The peanuts 14 have a width greater than a diameter of the annular ring 13 such that a forward side of the peanut or bulbous section extends forward of the forward side of the annular ring 13 and an aft side of the peanuts extends further aft than an aft side of the annular ring 13. The peanuts 14 also have a radial height greater than the radial height of the annular ring 13. Thus, each peanut extends the space formed within the IBR more than a circumferential channel that is formed by the annular ring 13. The ceramic core 10 is formed as a single piece. The ceramic core 10 is placed in a mold to form the IBR with the blades using an investment casting process in which liquid metal is poured into the mold and solidified over the ceramic core 10. After the metal in the mold has solidified, the ceramic core 10 is leached away leaving the cooling passages formed by the radial spikes 12 and the ring 13 and the peanuts 14 within the IBR. Cooling air holes can then be drilled through each blade and into the adjacent bulbous section formed by the peanuts 14. Drilling holes through each blade tip and into the bulbous sections can be done using an EDM tool.

Figure 2:
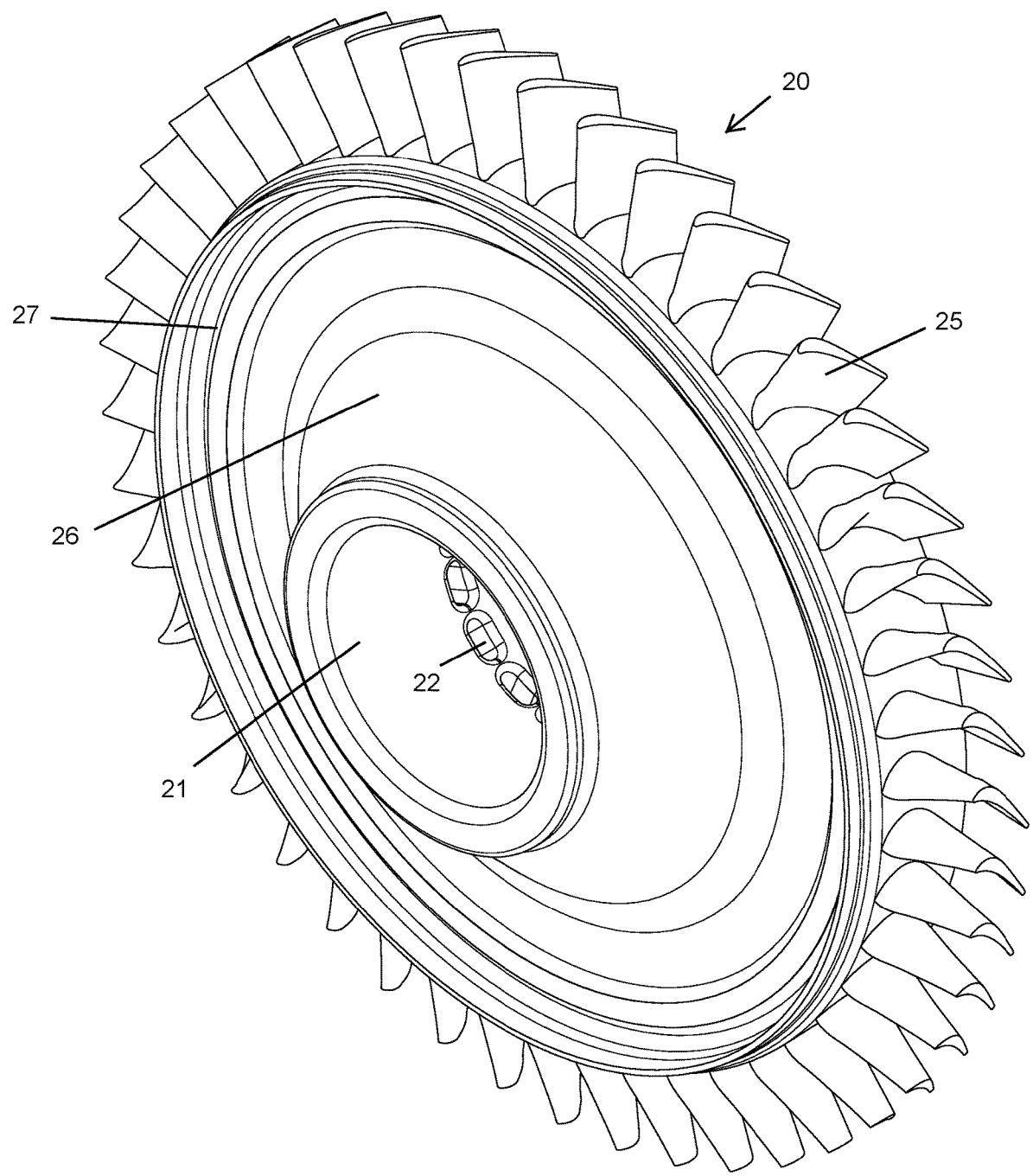
FIG. 2 shows an isometric view of an IBR with bore entry cooling holes cast using the ceramic core of FIG. 1 of the present invention.
Figure 3:
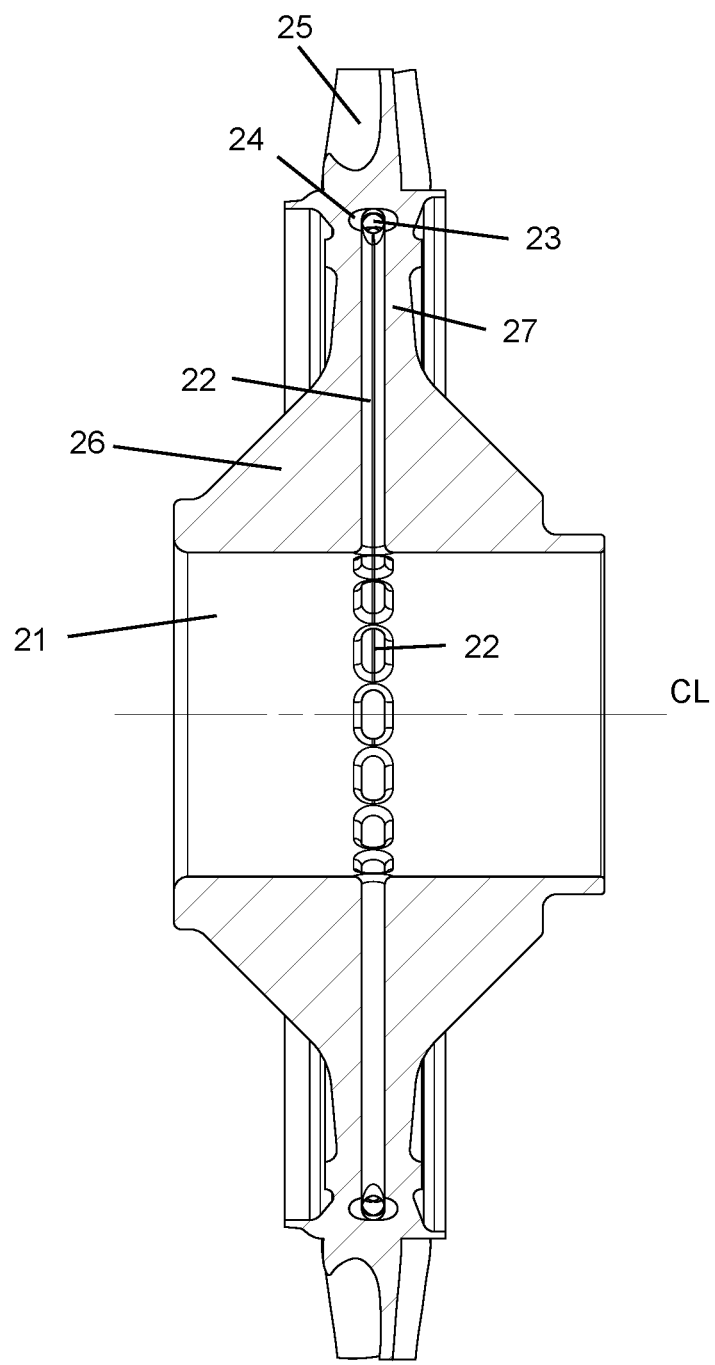
FIG. 3 shows a cross section side view of the cast IBR with bore entry cooling holes of FIG. 2 of the present invention.

The cast IBR 20 with blades 25 is shown in FIG. 2 with the axial bore 21 and cooling hole 22 openings in the inner bore 21. Each cooling hole 22 has an elliptical cross section shape with a major axis greater than a minor axis, and where the major axis of the openings is aligned in a direction perpendicular to a rotational axis (CL) of the bore 21. The hole openings 22 are closely spaced. FIG. 3 shows a cross section side view of the IBR with the axial bore 21 and the hole openings 22, the coolant passage 22 extending from the openings to the blade 25, a conical shaped part 26 of the disk and an upper part 27 that is substantially the same width, and the annular passage 23 formed by the ring 13 and the bulbous section 24 formed by the peanuts 14. The hole openings 22 are arranged with the major axis in an annular direction within the bore 21.

Figure 4:
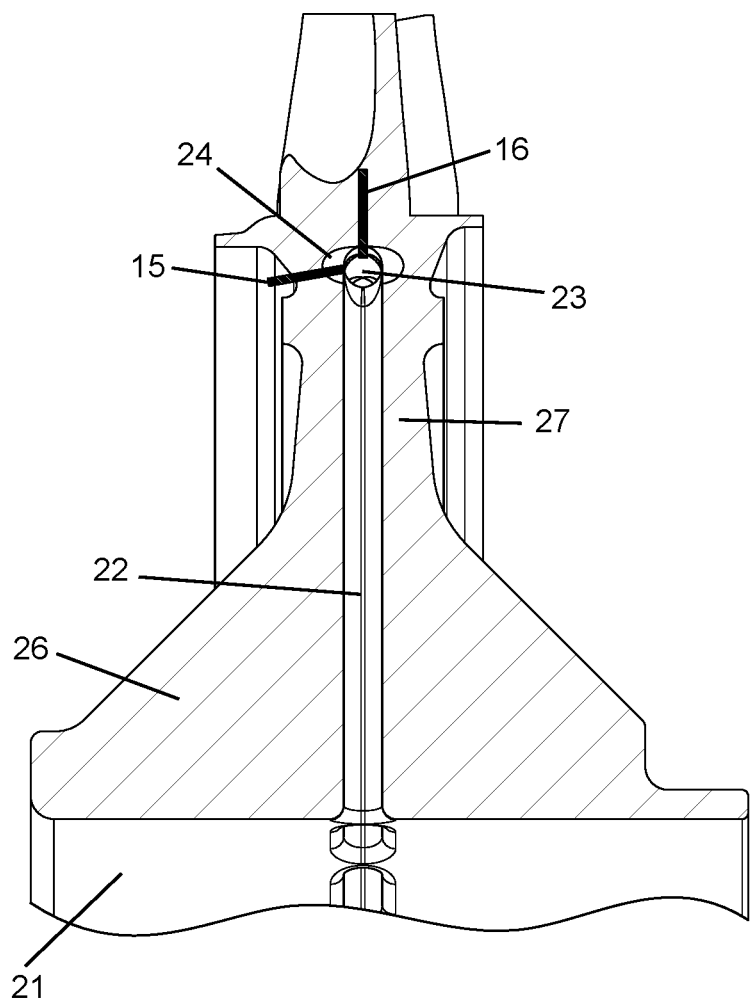
FIG. 4 shows a cross section side view of a section of the cast IBR of FIG. 3 with chaplets or pins of the present invention.

Another feature of the cast IBR with bore entry cooling holes is the use of chaplets or pins to support the ceramic core 10 within a mold. FIG. 4 shows chaplets or pins 15 and 16 that each extend into the ring 13 of the ceramic core 10 to secure and position the ceramic core 10 within the mold and prevent movement during the pouring phase. Chaplets 15 are axial chaplets or pins that support the ceramic core in the axial direction and could be located both on the forward side and aft side with the number of circumferential locations minimized to that required to provide adequate core stability during the casting process. Chaplets 16 are radial chaplets or pins and support the ceramic core in a fore and aft direction and may be used in conjunction with the axial support above or as the sole means of location keeping the number to a minimum as determined by casting trials. The radial pins penetrate to the flow path and are located between airfoils.

The invention claimed is:

1. An air cooled integrally bladed rotor for a gas turbine engine comprising:
   an axial bore formed within a rotor disk;
   a plurality of turbine rotor blades;
   a circumferential cooling air supply channel located below the plurality of turbine rotor blades;
   a plurality of radial cooling air supply channels;
   each radial cooling air supply channel having an inlet opening into the axial bore and an outlet opening into the circumferential cooling air supply channel;
   a plurality of bulbous chambers extending outward from the circumferential cooling air supply channel;
   a radial cooling air passage formed in each of the turbine rotor blades;
   each radial cooling air passage having an inlet opening into one of the plurality bulbous chambers and an outlet opening onto a tip of the turbine rotor blade; and,
   the rotor disk and the turbine rotor blades are cast as a single piece.

2. The air cooled integrally bladed rotor of claim 1, wherein each radial cooling air supply channel has an elliptical cross sectional shape with a major axis greater than a minor axis; and,
   the major axis is perpendicular to a central axis of the axial bore.

3. The air cooled integrally bladed rotor of claim 2, wherein there is substantially no space between adjacent openings of the radial cooling air supply channels in the axial bore.

4. The air cooled integrally bladed rotor of claim 1, wherein the rotor disk of the integrally bladed rotor includes an inner conical shaped section and a nearly constant width outer section.

5. The air cooled integrally bladed rotor of claim 1, wherein each bulbous chamber has a width greater than a cross-sectional diameter of the circumferential cooling air supply channel.

6. The air cooled integrally bladed rotor of claim 5, wherein each bulbous chamber extends forward of and aft of the circumferential cooling air supply channel.

7. The air cooled integrally bladed rotor of claim 1, wherein each radial cooling air supply channel within the integrally bladed rotor has three of the plurality of bulbous chambers.

8. The air cooled integrally bladed rotor of claim 1, wherein each opening of the radial cooling air supply channels has an elliptical cross sectional shape.

\* \* \* \* \*